(12) United States Patent
Taguchi (10) Patent No.: US 8,562,001 B2
(45) Date of Patent: Oct. 22, 2013

(54) TOOL HOLDER

(75) Inventor: Masahiro Taguchi, Daito (JP)

(73) Assignee: Nikken Kosakusho Works, Ltd., Daito-shi (JP)

( * ) Notice: Subject to any disclaimer, the term of this patent is extended or adjusted under 35 U.S.C. 154(b) by 963 days.

(21) Appl. No.: 12/653,297

(22) Filed: Dec. 11, 2009

(65) Prior Publication Data

US 2010/0148455 A1  Jun. 17, 2010

(30) Foreign Application Priority Data

Dec. 15, 2008 (JP) ................................. 2008-318685
Oct. 29, 2009 (JP) ................................. 2009-249189

(51) Int. Cl.
*B23B 31/20* (2006.01)

(52) U.S. Cl.
USPC ................................. 279/42; 279/47; 279/56

(58) Field of Classification Search
USPC ........ 279/42, 43.2, 43.4, 47, 48, 46.3, 51, 52, 279/56
See application file for complete search history.

(56) References Cited

U.S. PATENT DOCUMENTS

| | | | |
|---|---|---|---|
| 1,617,998 A * | 2/1927 | Fegley | 279/56 |
| 2,272,185 A | 2/1942 | Chittenden | |
| 2,358,300 A | 9/1944 | Benjamin et al. | |
| 2,778,651 A | 1/1957 | Benjamin et al. | |
| 3,035,845 A * | 5/1962 | Benjamin | 279/47 |
| 3,195,909 A | 7/1965 | Winnen | |
| 3,332,693 A * | 7/1967 | Armstrong et al. | 279/47 |
| 3,365,204 A * | 1/1968 | Benjamin et al. | 279/51 |
| 3,618,962 A * | 11/1971 | Cox et al. | 279/82 |
| 5,522,605 A | 6/1996 | Lewis et al. | |
| 5,788,248 A * | 8/1998 | Gibson | 279/51 |
| 6,886,835 B2 * | 5/2005 | Komine | 279/42 |
| 7,306,238 B2 | 12/2007 | Oshnock et al. | |
| 2004/0164502 A1 * | 8/2004 | Taguchi et al. | 279/52 |

FOREIGN PATENT DOCUMENTS

| | | |
|---|---|---|
| DE | 91 09 301 | 11/1992 |
| JP | 07-027712 | 5/1995 |
| JP | 2000-317767 | 11/2000 |
| JP | 2001219310 A * | 8/2001 |
| JP | 2006095612 A * | 4/2006 |
| JP | 2008-044035 | 2/2008 |
| JP | 2008-168373 | 7/2008 |
| JP | 2008-531316 | 8/2008 |

OTHER PUBLICATIONS

European Search Report for Application No. EP 09 17 9113, dated Mar. 29, 2010, 7 pages.

* cited by examiner

*Primary Examiner* — Eric A Gates
*Assistant Examiner* — Paul M Janeski
(74) *Attorney, Agent, or Firm* — W. F. Fasse (57) ABSTRACT

A tool holder includes: a collet chuck main body having a tapered hole formed in its tip end portion so as to be tapered toward an axial rear end; a tapered collet having a tool insertion hole that extends in an axial direction, a main tapered surface that fits in the tapered hole, and a tip end tapered surface positioned on an axial tip end side of the main tapered surface, and tapered toward an axial tip end; a cylindrical lock nut having internal threads that are screwed on external threads formed on an outer periphery of the tip end portion of the collet chuck main body, for reducing a diameter of the tool insertion hole by pressing the tapered collet into the tapered hole; a tip end tapered member having a tapered abutting surface that fits on the tip end tapered surface, the tip end tapered member being pressed toward the axial rear end by the lock nut; and a plain bearing positioned in a plane perpendicular to a direction in which the tip end tapered member is pressed by the lock nut, the plain bearing being inserted between the lock nut and the tip end tapered member.

7 Claims, 6 Drawing Sheets

TOOL HOLDER

BACKGROUND OF THE INVENTION

1. Field of the Invention

The present invention relates to a tool holder including: a collet chuck main body having a tapered hole formed in its tip end portion; a double tapered collet having two tapered surfaces, which are a main tapered surface and a tip end tapered surface; and a cylindrical lock nut that is screwed onto external threads formed on the outer periphery of the tip end portion of the collet chuck main body, and thus, presses the taper collet into the tapered hole, thereby reducing the diameter of a tool insertion hole.

2. Description of the Background Art

In a generally known type of tool holders for holding a shank portion of a cutting tool, a lock nut is screwed onto a collet chuck main body, whereby the lock nut presses a tapered collet into a tapered hole of the collet chuck main body. At this time, the diameter of the tapered collet is reduced, whereby the tapered collet holds the shank portion. Various such tool holders have been used in practical applications.

A problem of this type of tool holders is that the tapered collet is tilted with respect to the axis of the collet chuck main body when pressed into the tapered hole of the collet chuck main body. This reduces the deflection accuracy of the cutting tool because the shank portion of the cutting tool is not aligned with the axis of the collet chuck main body.

A collet chuck described in Japanese Utility Model Publication No. H07-27712 of unexamined applications is known as a solution to this problem. In the collet chuck of Japanese Utility Model Publication No. H07-27712 of unexamined applications, a tapered collet is a double tapered collet that includes a tapered surface that is tapered toward the tip end, in addition to a main tapered surface that is closely fitted in a collet chuck main body. Moreover, a lock nut has a lock nut main body, and an annular nose ring that is fitted in the front part of the lock nut main body in a relatively rotatable manner with spherical balls interposed therebetween. An annular stepped portion is formed in the outer periphery of the nose ring so that the outer diameter of the front part of the nose ring becomes smaller than the rear part thereof. The inner diameter of the front end of the lock nut main body is smaller than the outer diameter of the rear part of the nose ring. The annular stepped portion formed in the outer periphery of the nose ring serves as an inner raceway on which the plurality of balls roll. An annular groove is formed in the inner periphery of the lock nut main body, and this annular groove serves as an outer raceway on which the plurality of balls roll.

However, the above conventional tapered collet has the following problem. When fastened with a large force, the lock nut moves rearward toward the collet chuck main body. Thus, the balls are compressed between the outer raceway of the lock nut and the inner raceway of the nose ring, which hinders smooth radial movement of the nose ring for aligning the axis. As a result, the axis of the nose ring is not stably aligned with the axis of the collet chuck main body. Thus, the tapered collet can be tilted with respect to the axis of the collet chuck main body when rotating and fastening the lock nut, and the axis of the tool may not be aligned with the axis of the collet chuck main body, resulting in unstable deflection accuracy of the tool.

SUMMARY OF THE INVENTION

In view of the above problems, it is an object of the present invention to provide a tool holder capable of stabilizing the deflection accuracy of a tool regardless of the magnitude of a force for fastening a lock nut.

In order to achieve the above object, a tool holder according to one aspect of the present invention includes: a collet chuck main body having a tapered hole formed in its tip end portion so as to be tapered toward an axial rear end; a tapered collet having a tool insertion hole that extends in an axial direction, a main tapered surface that fits in the tapered hole, and a tip end tapered surface positioned on an axial tip end side of the main tapered surface, and tapered toward an axial tip end; a cylindrical lock nut having internal threads that are screwed on external threads formed on an outer periphery of the tip end portion of the collet chuck main body, for reducing a diameter of the tool insertion hole by pressing the tapered collet into the tapered hole; a tip end tapered member having a tapered abutting surface that fits on the tip end tapered surface, the tip end tapered member being pressed toward the axial rear end by the lock nut; and a plain bearing positioned in a plane perpendicular to a direction in which the tip end tapered member is pressed by the lock nut, the plain bearing being inserted between the lock nut and the tip end tapered member.

According to the present invention, since the tool holder includes the plain bearing that is inserted between the lock nut and the tip end tapered member, the plain bearing can reduce the frictional resistance between the lock nut and the tip end tapered member. Thus, even if the lock nut is fastened with a large force, the plain bearing allows the tip end tapered member to be displaced in a direction perpendicular to the axis, whereby the tip end tapered member is fastened together with the tapered collet along the tapered hole of the collet chuck main body. As a result, the axis of the tapered collet is stably aligned with the axis of the collet chuck main body, whereby stable deflection accuracy can be obtained even when the lock nut is fastened with a large force.

According to the present invention, the tip end tapered member has the tapered abutting surface at the tip end of its inner periphery, and the tapered abutting surface fits on the tip end tapered surface of the tapered collet. Thus, by fastening the lock nut with a large force, the tapered abutting surface of the tip end tapered member closely fits on the tip end tapered surface of the tapered collet. This enables the tip end tapered member to support the tip end of the tapered collet, which is located on the tip end side of a gauge line, thereby preventing displacement of a tool.

The present invention is not limited to one embodiment, and the tip end tapered member may have an outward protruding portion that protrudes radially outward, and the lock nut may have a recess that is recessed radially outward so as to receive the outward protruding portion of the tip end tapered member. Alternatively, the lock nut may have an inward protruding portion that protrudes radially inward. The plain bearing is inserted between the inward protruding portion of the lock nut and the outward protruding portion of the tip end tapered member. According to this embodiment, the lock nut can preferably press the tapered collet into the tapered hole via the tip end tapered member.

A tool holder according to another aspect of the present invention includes: a collet chuck main body having a tapered hole formed in its tip end portion so as to be tapered toward an axial rear end; a tapered collet having a tool insertion hole that extends in an axial direction, a main tapered surface that fits in said tapered hole, and a tip end tapered surface positioned on an axial tip end side of said main tapered surface, and tapered toward an axial tip end; a cylindrical lock nut having internal threads that are screwed on external threads formed on an outer periphery of the tip end portion of the collet chuck main body, and an inward protruding portion that protrudes radially inward, for reducing a diameter of the tool insertion hole by pressing the tapered collet into the tapered hole; and a tip end tapered member having a tapered abutting surface that fits on the tip end tapered surface, and a low friction flat surface that faces the inward protruding portion of the lock nut, and has been surface treated to reduce a friction coefficient, the tip end tapered member being pressed toward the axial rear end by the lock nut.

According to the present invention, since the tip end tapered member has the low friction flat surface, which faces the inward protruding portion of the lock nut and has been surface treated to reduce the friction coefficient, the frictional resistance between the lock nut and the tip end tapered member can be reduced. Thus, even if the lock nut is fastened with a large force, the low friction flat surface allows the tip end tapered member to be displaced in a direction perpendicular to the axis, whereby the tip end tapered member is fastened together with the tapered collet along the tapered hole of the collet chuck main body. As a result, the axis of the tapered collet is stably aligned with the axis of the collet chuck main body, whereby stable deflection accuracy of the tool is obtained even if the lock nut is fastened with a large force.

Preferably, the tapered collet further has a ring groove formed in a portion of its outer periphery between the main tapered surface and the tip end tapered surface, and extending in a circumferential direction, and the tip end tapered member further has a protrusion that engages with the ring groove of the tapered collet. According to this embodiment, the tapered collet can be moved toward the tip end side when loosening the lock nut. This facilitates the operation of removing the tapered collet from the collet chuck main body.

More preferably, a sidewall on a tip end side of the ring groove of the tapered collet has a tapered surface that is tapered toward the axial rear end, and the protrusion of the tip end tapered member has a tapered abutting surface that abuts on the tapered surface of the ring groove. According to this embodiment, the tapered collet can be removed toward the tip end side without being tilted, when loosening the lock nut. Moreover, since the sidewall on the tip end side of the ring groove has the tapered surface that is tapered toward the axial rear end, the operation of removing the tapered collet from the tip end tapered member is facilitated.

Various embodiments are possible for the protrusion of the tip end tapered member. The protrusion may be provided on the inner periphery of the tip end tapered member so as to be discontinuous in the circumferential direction, or may be a ridge formed on the inner periphery of the tip end tapered member so as to extend in the circumferential direction.

In a preferred embodiment, the tip end tapered member has a ring shape that surrounds the outer periphery of the tapered collet, the protrusion of the tip end tapered member is a ridge formed on the inner periphery of the tip end tapered member so as to protrude radially inward and to extend in the circumferential direction, and a contour shape of an inner peripheral edge of the ridge is a circle whose center is offset from an axial center of the tip end tapered member. According to this embodiment, the ridge extending in the circumferential direction firmly engages with the ring groove of the tapered collet, and the tapered collet can be removed from the collet chuck main body by loosening the lock nut.

Moreover, since the contour shape of the inner peripheral edge of the ridge is a circle whose center is offset from the axial center of the tip end tapered member, the distance from a part of the inner peripheral edge, which is located on the offset side, to the axial center is longer than the radius of the inner peripheral edge. Thus, the tip end tapered member has a larger inner space region on the offset side. Accordingly, the tapered collet can be easily removed from the inner space region on the offset side. Moreover, the tapered collet can be easily inserted into the inner space region of the tip end tapered member by reverse procedures.

The present invention is not limited to one embodiment, and the tool holder of the present invention may further include retaining means attached to an inner periphery of the lock nut, for receiving a rear end of the tip end tapered member. The retaining means may be a snap ring, a key member, or the like. According to this embodiment, the tip end tapered member can be moved together with the lock nut toward the tip end side when loosening the lock nut, and the tapered collet can be reliably removed from the collet chuck main body. Moreover, the retaining means can be removed from the lock nut, whereby the lock nut can be easily disassembled. This improves the efficiency of maintenance.

The present invention is not limited to one embodiment, and the tool holder according to the present invention may further include a lid member attached to a tip end opening of the lock nut, for sealing the tip end opening while facing a tip end of the tapered collet, and the lid member has a tool through hole through which a shank portion of a tool extends, and a cutting fluid passage extending from a rear end face to a tip end face of the lid member, for blowing a cutting fluid toward a tip end of the tool. According to this embodiment, since the lid member has the cutting fluid passage extending from the rear end face to the tip end face of the lid member, for blowing the cutting fluid toward the tip end of the tool, the cutting fluid can be supplied to the tip end of the tool without using a tool having a through hole for a cutting fluid. This prevents an increase in temperature of the tool and the tool holder, and enables the tip end of the cutting tool for processing a work to be efficiently cooled. Moreover, unlike conventional examples, a dustproof function of the tool holder can be obtained without requiring the step of attaching a steel cover to the tip end of the tool holder. Moreover, even if the cutting tool is replaced with a tool having a different shank diameter, the lid member need only be replaced with a lid member having a tool through hole of a different inner diameter. Thus, the tool holder is very versatile and economical.

Alternatively, the tool holder according to the present invention may further include a lid member attached to a tip end opening of the lock nut, for sealing the tip end opening while facing the tip end of the tapered collet, and the lid member may have a tool through hole through which the shank portion of the tool extends, and a seal member provided on an inner periphery of the tool through hole, for closing a gap between the inner periphery of the tool through hole and an outer periphery of the shank portion of the tool. According to this embodiment, since the lid member has the seal member provided on the inner periphery of the tool through hole, for closing the gap between the inner periphery of the tool through hole and the outer periphery of the shank portion of the tool, the cutting fluid can be prevented from flowing out toward the tip end through the gap between the inner periphery of the tool through hole and the outer periphery of the shank portion of the tool, and the shank portion can be sealed in a fluid-tight manner. Thus, leakage of the cutting fluid can be prevented when chucking a tool having a through hole for a cutting fluid, and supplying the cutting fluid into a shank portion of the tool.

As described above, the tool holder according to one aspect of the present invention has the plain bearing, which is positioned in a plane perpendicular to the direction in which the tip end tapered member is pressed by the lock nut, and which is inserted between the lock nut and the tip end tapered member. Thus, even if the lock nut is fastened with a large force, the plain bearing allows the tip end tapered member to be displaced in the direction perpendicular to the axis. Therefore, the tip end tapered member is fastened together with the tapered collet along the tapered hole of the collet chuck main body, regardless of the posture of the lock nut. Thus, the axis of the tapered collet is stably aligned with the axis of the collet chuck main body, and stable deflection accuracy of the tool can be obtained even when a strong fastening force is applied.

The tool holder according to the present invention has the tip end tapered member, which has the tapered abutting surface that fits on the tip end tapered surface of the tapered collet, and which is pressed toward the axial rear end by the lock nut. Thus, by fastening the lock nut with a large force, the inner periphery of the tip end tapered member is closely fitted on the tip end of the outer periphery of the tapered collet. This enables the tip end member to support the tip end of the outer periphery of the tapered collet, which is located on the tip end side of the gauge line, whereby displacement of the tool can be prevented. Thus, the tool holder of the present invention is advantageously used for cutting processes in which a large lateral force is applied, and cutting processes using a special tool having a large distance from a collar portion of the tapered collet to the tip end of the tool.

According to another aspect of the present invention, the tip end tapered member has the low friction flat surface, which faces the inward protruding portion of the lock nut and has been surface treated to reduce the friction coefficient. Thus, even if the lock nut is fastened with a large force, the low friction flat surface allows the tip end tapered member to be displaced in a direction perpendicular to the axis, whereby the tip end tapered member is fastened together with the tapered collet along the tapered hole of the collet chuck main body, regardless of the posture of the lock nut. As a result, the axis of the tapered collet is stably aligned with the axis of the collet chuck main body, whereby stable deflection accuracy of the tool is obtained even when a strong fastening force is applied.

DESCRIPTION OF THE PREFERRED EMBODIMENTS

Figure 1:
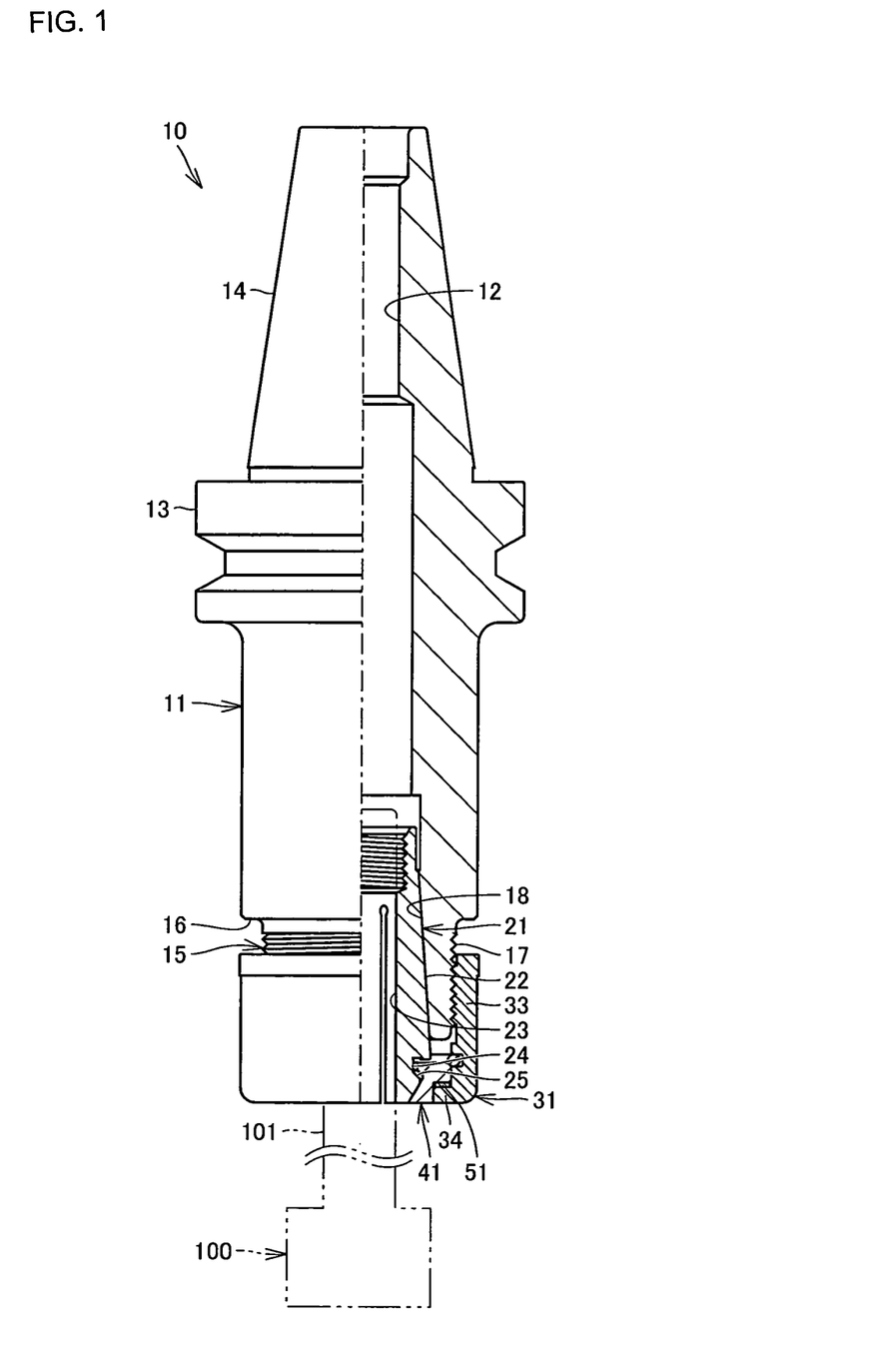
FIG. 1 is an overall view of a tool holder according to an embodiment.
Figure 2:
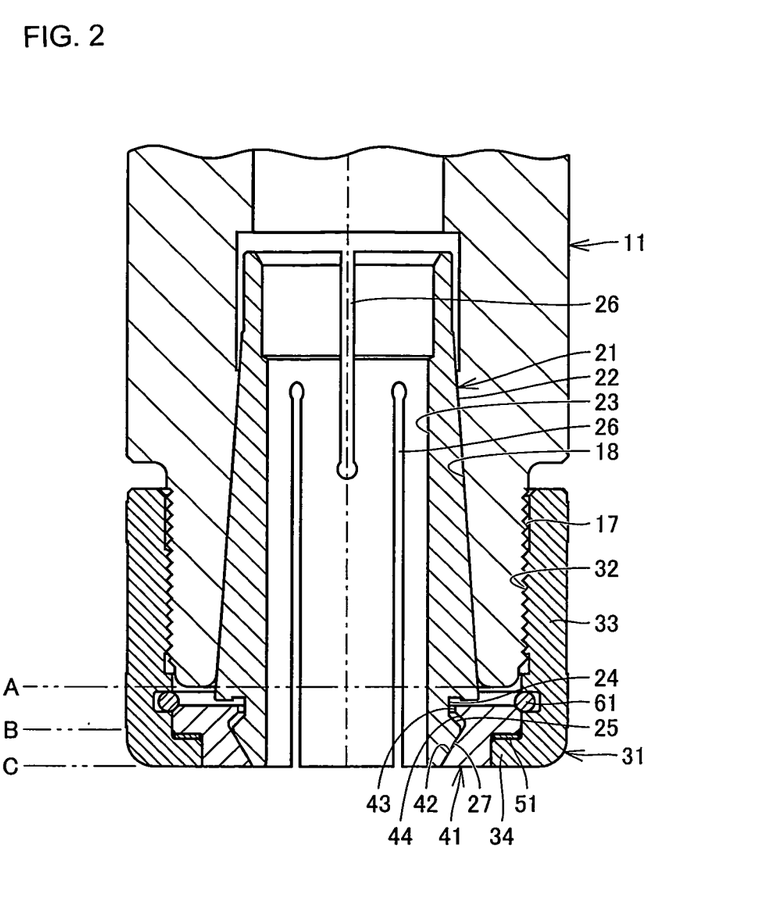
FIG. 2 is an enlarged longitudinal section of a tip end portion of the embodiment.

Embodiments of the present invention will be described in detail below with reference to the accompanying drawings. FIG. 1 is an overall view of a tool holder according to an embodiment of the present invention, where the right side of FIG. 1 is a longitudinal section, and the left side of FIG. 1 is a side view. FIG. 2 is an enlarged longitudinal section of a tip end portion of the tool holder of the present embodiment.

Figure 3:
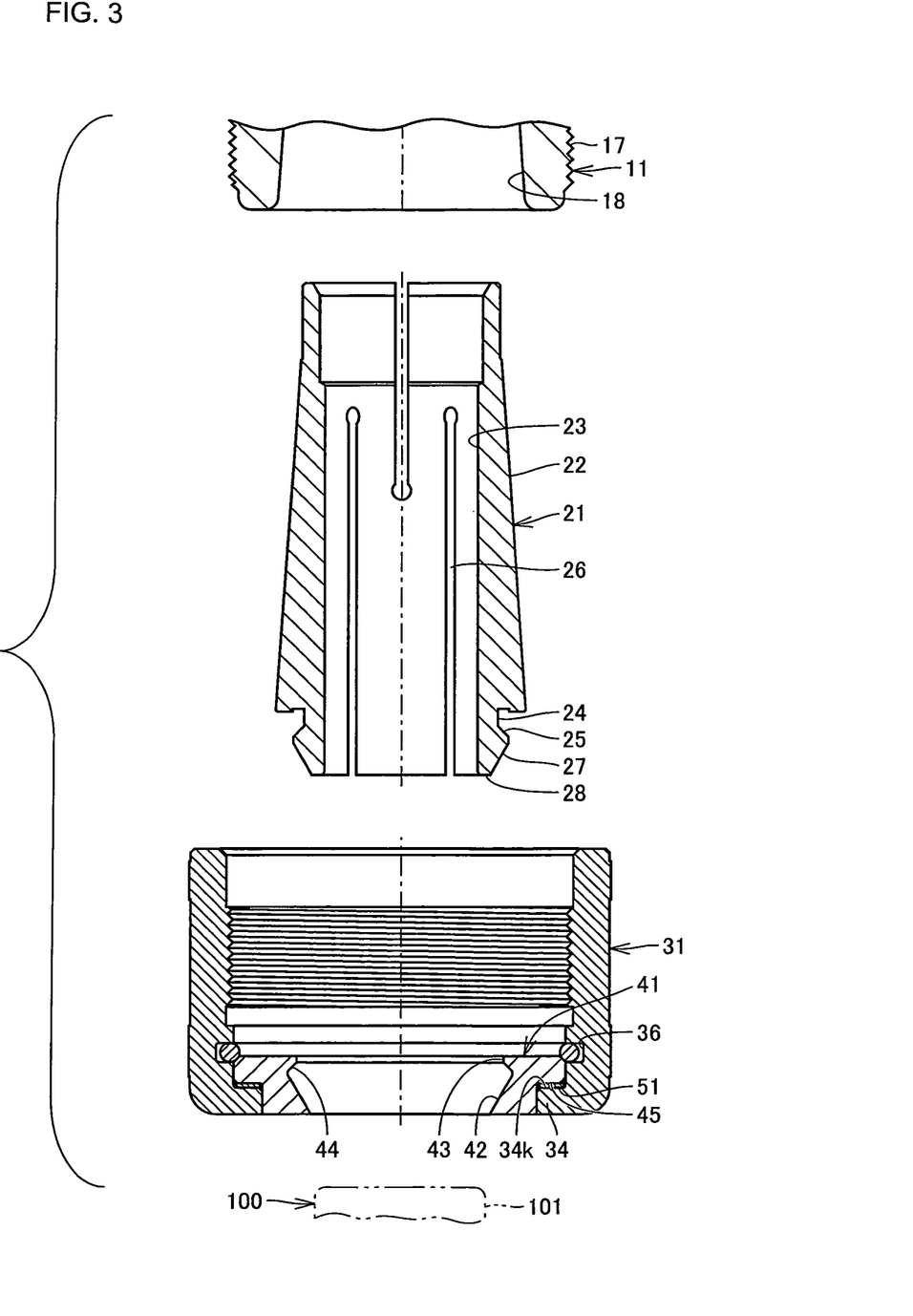
FIG. 3 is an exploded view showing components of the tool holder of the embodiment.

FIG. 3 is an exploded longitudinal section showing members of the tool holder of the present embodiment.

Main components of a tool holder 10 include a collet chuck main body 11, a tapered collet 21, a lock nut 31, a tip end tapered member 41, a plain bearing 51, and a snap ring 61. The tool holder 10, having these components 11, 21, 31, 41, and 51 assembled together, holds a shank portion 101 of a cutting tool 100.

The collet chuck main body 11 has a through hole 12 in the middle. The through hole 12 extends from a tip end to a rear end of the collet chuck main body 11 along its axis shown by chain line. A holding flange portion 13 is formed on an axially intermediate portion of the outer periphery of the collet chuck main body 11 so as to protrude radially outward. A tapered shank portion 14 is formed so that its diameter is reduced from the holding flange portion 13 toward the rear end. The tool holder 10 is attached to a main shaft of a machine tool, not shown, by the tapered shank portion 14.

The tip end of the collet chuck main body 11, which is located on the side opposite to the tapered shank portion 14, is a tool attachment portion 15 for holding the shank portion 101. The tool attachment portion 15 has a cylindrical shape with an annular stepped portion 16 on its outer periphery. A tip end portion of the tool attachment portion 15 has a smaller outer diameter than that of the intermediate portion of the collet chuck main body 11, and external threads 17 are formed in the outer periphery of the tip end portion of the tool attachment portion 15. A tip end portion of the through hole 12, which is the inner periphery of the tool attachment portion 15, is a tapered hole 18, which is tapered toward the rear end so that its diameter increases toward the tip end.

The cylindrical tapered collet 21 fits in the tapered hole 18. The inner periphery of the tapered collet 21 serves as a tool insertion hole 23. The tool insertion hole 23 extends axially through the tapered collet 21 from its rear end to its tip end. The shank portion 101 of the cutting tool 100 is inserted into the tool insertion hole 23 from the tip end side thereof. Thus, the tip end side in the axial direction is hereinafter sometimes referred to as the "tool insertion side."

A rear end portion of the outer periphery of the tapered collet 21 is a main tapered surface 22 having its diameter reduced toward the rear end. The main tapered surface 22 extends from the rear end portion to an axially intermediate portion of the tapered collet 21, and fits in the above tapered hole 18.

A ring groove 24 is formed in a tip end portion of the outer periphery of the tapered collet 21, which adjoins the main tapered surface 22. The ring groove 24 extends along the entire circumference of the tapered collet 21. The tip end tapered member 41, which will be described below, engages with the ring groove 24. A sidewall on the tip end side of the ring groove 24 is a tapered surface 25, which is tapered toward the axial rear end so that its outer diameter increases toward the tip end.

A portion of the outer periphery of the tapered collet 21, which is located on the tip end side of the tapered surface 25, is a tip end tapered surface 27 having its diameter reduced toward the tip end. The tip end tapered surface 27 is formed in the very tip end of the outer periphery of the tapered collet 21. The tip end tapered surface 27 adjoins the tapered surface 25 of the ring groove 25, but a chamfer may be provided between the tapered surfaces 25, 27.

The tapered collet 21 has slit-like slots 26 extending parallel to the axis. Some of the slots 26 extend from the end on the tool insertion side of the tapered collet 21 to an intermediate portion thereof, and the other slots 26 extend from the rear end of the tapered collet 21 to an intermediate portion thereof. All the slots 26 are positioned at regular intervals in the circumferential direction. The diameter of the tapered collet 21 can be varied by compressing the slots 26.

Internal threads 32, which are formed in the inner periphery of the cylindrical lock nut 31, are screwed on the external threads 17 formed in the outer periphery of the tip end portion of the collet chuck main body 11. The lock nut 31 is a member that is screwed onto the collet chuck main body 11 to press the tapered collet 21 toward the axial rear end. The tapered collet 21 is thus pressed into the tapered hole 18, whereby the diameter of the tool insertion hole 23 is reduced.

The lock nut 31 has a cylindrical portion 33 and an inward flange portion 34. The cylindrical portion has the internal threads 32 formed in its inner periphery so that the internal threads 32 are screwed on the external threads 17 formed in the outer periphery of the tip end portion of the collet chuck main body 11. The inward flange portion 34 is formed at the tip end of the cylindrical portion 33, and protrudes radially inward. A rear end flat surface 34k of the inward flange portion 34 is an annular flat surface that extends perpendicularly to the axis. The tip end tapered member 41 is attached to a portion of the inner periphery of the cylindrical portion 33, which is located on the rear end side of the rear end flat surface 34k.

The tip end tapered member 41 has an annular shape, and has a tapered abutting surface 42 at the tip end of its inner periphery. The tapered abutting surface 42 fits on the tip end tapered surface 27. The tip end tapered member 41 has a ring ridge 43 on a portion of its inner periphery located on the rear end side of the tapered abutting surface 42. The ring ridge 43 engages with the ring groove 24 formed in the outer periphery of the tapered collet 21. The ring ridge 43 is a protrusion that protrudes radially inward, and a plurality of ring ridges 43 may be provided at predetermined intervals in the circumferential direction.

A sidewall on the tip end side of the ring ridge 43 forms a tapered abutting surface 44, which is tapered toward the axial rear end so that its diameter increases toward the tip end. The gradient of the tapered abutting surface 44 with respect to the axis is the same as that of the tapered surface 25 of the tapered collet 21.

The rear end portion of the outer periphery of the tip end tapered member 41, which protrudes radially outward, has a larger outer diameter than that of the tip end portion of the outer periphery of the tip end tapered member 41. This rear end portion of the outer periphery of the tip end tapered member 41 has an annular flat surface 45 that faces the inward flange portion 34. The plain bearing 51 is inserted between the annular flat surface 45 of the tip end tapered member 41 and the rear end flat surface 34k of the lock nut 31.

The plain bearing 51 is a kind of sliding bearing for transmitting an axial force while reducing the friction in a direction perpendicular to the axial direction, and is a ring disc-shaped plate member having an outer diameter corresponding to the inner peripheral diameter of the lock nut 31. A rear end face of the plain bearing 51 contacts the annular flat surface 45 of the tip end tapered member 41, and a tip end face of the plain bearing 51 contacts the annular rear end flat surface 34k of the inward flange portion 34. The plain bearing 51, which receives an axial pressing force between the inward flange portion 34 and the tip end tapered member 41, reduces the frictional resistance between both contact surfaces (the rear end flat surface 34k and the annular flat surface 45).

The plain bearing 51 is made of a hardened, polished steel plate or the like so as to have an annular plate shape. Both surfaces of the plain bearing 51, which are the rear end face and the tip end face, have been subjected to a friction reducing treatment for reducing the frictional resistance between the annular flat surface 45 and the rear end flat surface 34k. Examples of such a treatment include an ion nitriding treatment, a diamond like carbon (DLC) coating treatment, a titanium nitride (TiN) coating treatment, and a mirror lapping treatment. Both surfaces of the plain baring 51 may have been subjected to oil-film lubrication solely or together with the above treatment.

The plain bearing 51 and the tip end tapered member 41 are sequentially inserted into the lock nut 31 through a rear end opening of the lock nut 31, so that the tip end tapered member 41 abuts on the inward flange portion 34. The snap ring 61 is fitted in an annular engagement groove 36 formed in the inner periphery of the tip end portion of the lock nut 31. Thus, the tip end tapered member 41 is detachably held in the lock nut 31. The snap ring 61, which serves as retaining means, contacts the outer peripheral edge of the rear end of the tip end tapered member 41 to prevent the tip end tapered member 41 from being removed from the lock nut 31.

Thus, the plain bearing 51 is accommodated in the lock nut 31, and the tip end tapered member 41 is attached to the inner periphery of the lock nut 31 in a relatively rotatable manner. Moreover, the tip end tapered member 41 is allowed to move slightly in the direction perpendicular to the axis. Thus, when the tip end tapered member 41 engages with the ring groove 24 of the tapered collet 21, and the inward flange portion 34 presses the tip end tapered member 41 toward the axial rear end, the rear end flat surface 34k and the annular flat surface 45 are smoothly brought into sliding contact with each other in a plane perpendicular to the axis via the plain bearing 51 interposed therebetween.

Note that the number of plain bearings 51 that are interposed between the rear end flat surface 34k of the inward flange portion 34 and the annular flat surface 45 of the tip end tapered member 41 is not limited to one, and a plurality of plain bearings 51 may be inserted therebetween.

A chucking operation will be described below.

First, the plain bearing 51, the tip end tapered member 41, and the snap ring 61 are attached in advance to the tip end portion of the lock nut 31. Then, a tip end portion 28 of the tapered collet 21 is inserted into the rear end opening of the lock nut 31 so that the diameter of the tip end portion 28 of the tapered collet 21 becomes smaller than the inner diameter of the ring ridge 43 of the tip end tapered member 41. In this state, the tip end portion 28 of the tapered collet 21 is inserted into a central hole of the tip end tapered member 41. As inserted further in the central hole, the tip end portion 28 restores to its original outer diameter, whereby the ring groove 24 engages with the ring ridge 43. Thus, the tapered collet 21 is attached to the lock nut 31 in a relatively rotatable manner.

Then, the main tapered surface 22 of the tapered collet 21 is inserted into the tapered hole 18 of the collet chuck main body 11. Then, the internal threads 32 of the lock nut 31 are screwed on the external threads 17 of the collet chuck main body 11, whereby the lock nut 31 is temporarily fastened to the collet chuck main body 11. Then, the shank portion 101 of the cutting tool 100 is inserted into the tool insertion hole 23 of the tapered collet 21. At this time, the shank portion 101 is inserted from the tip end side of the lock nut 31. In this temporarily fastened state, the diameter of the tapered collet 21 has not been reduced at all, or has been hardly reduced. Thus, the shank portion 101 can be easily inserted through the tool insertion hole 23.

Then, the internal threads 32 and the external threads 17 are further rotated (screwed) relative to each other to securely fasten the lock nut 31 to the collet chuck main body 11. Thus, the tapered abutting surface 42 of the tip end tapered member 41 is closely fitted on the tip end tapered surface 27 of the tapered collet 21, thereby firmly holding the tip end portion 28 of the tapered collet 21. At the same time, the tip end tapered member 41 presses the tip end portion 28 of the tapered collet 21 toward the rear end, and the main tapered surface 22 is pressed into the tapered hole 18 of the collet chuck main body 11. Thus, the diameter of the tapered collet 21 is reduced by compressing the slots 26, and the shank portion 101 of the cutting tool 100 is thereby chucked in the tool holder.

At this time, since the plain bearing 51 is interposed between the annular flat surface 45 of the tip end tapered member 41 and the rear end flat surface 34$k$ of the lock nut 31, the frictional resistance between these contact surfaces, which are in sliding contact with each other, is significantly reduced. Thus, a pressing force resulting from fastening of the lock nut 31 is uniformly applied to the tapered collet 21.

At this time, the tip end tapered member 41, together with the tip end portion 28, are aligned with the axis of the collet chuck main body 11 by the tapered hole 18.

As a result, the main tapered surface 22 of the tapered collet 21 moves along the taper of the tapered hole 18 without being tilted, and the tapered collet 21 can be reliably pressed into the tapered hole 18.

A de-chucking operation will be described below. By loosening the lock nut 31 screwed on the collet chuck main body 11, the tapered abutting surface 44 of the ring ridge 43 engaging with the ring groove 24 abuts on the tapered surface 25 of the ring groove 24, and a pulling force of the lock nut 31 is uniformly applied to the tapered collet 21 via the tip end tapered member 41.

At this time, the tip end tapered member 41, together with the tip end portion 28, are aligned with the axis of the collet chuck main body 11 by the tapered hole 18.

As a result, the main tapered surface 22 of the tapered collet 21 moves along the taper of the tapered hole 18 without being tilted, and the tapered collet 21 can be reliably removed from the tapered hole 18.

The tool holder 10 of the present embodiment includes the plain bearing 51, which is inserted between the lock nut 31 and the tip end tapered member 41.

More specifically, the lock nut 31 has the inward flange portion 34 that protrudes radially inward. The rear end of the outer periphery of the tip end tapered member 41 protrudes radially outward more than the tip end of the outer periphery of the tip end tapered member 41 does. The tip end side of the rear end of the outer periphery of the tip end tapered member 41 has the annular flat surface 45. The plain bearing 51 is inserted between the inward flange portion 34 and the annular flat surface 45. Thus, both surfaces of the plain bearing 51 contact the annular flat surface 45 and the rear end flat surface 34$k$ of the inward flange portion 34, respectively, whereby the frictional resistance between the contact surfaces can be significantly reduced.

Thus, a pressing force resulting from fastening of the lock nut 31 is uniformly applied to the tapered collet 21, and no torsional force resulting from rotation of the lock nut 31 is transmitted to the tapered collet 21. As a result, even if the lock nut 31 is fastened with a large force, the plain bearing 51 allows the tip end tapered member 41 to be displaced in the direction perpendicular to the axis, whereby the tip end tapered member 41 is fastened together with the tapered collet 21 along the tapered hole 18 of the collet chuck main body 11. Thus, the main tapered surface 22 of the tapered collet 21 moves along the tapered hole 18 without being tilted, and the tapered collet 21 is reliably pressed into the tapered hole 18.

Moreover, the tapered collet 21 is not tilted when fastening the lock nut 31. As a result, the shank portion 101 can be chucked by the collet chuck main body 11 without being tilted with respect to the axis of the collet chuck main body 11, whereby deflection rotation of the cutting tool 100 held by the tapered collet 21 can be eliminated, and stable deflection accuracy can be obtained.

Moreover, according to the tool holder 10 of the present embodiment, fastening the lock nut 31 causes the tip end of the lock nut 31 to be closely fitted on the tip end tapered surface 27 formed in the tip end of the tapered collet 21, whereby the shank portion 101 can be held between a rear end B of the tip end tapered surface 27 and a tip end C of the tapered abutting surface 42. Thus, the tip end tapered member 41, which forms a tip end opening of the lock nut 31, can restrict radial displacement of the tip end portion 28, which is located on the tip end side of a gauge line A (FIG. 2) located at the tip end of the tapered hole 18. The tool holder 10 of the present embodiment is thus highly advantageous over conventional tool holders that hold the tapered collet 21 only by the tapered hole 18 (only by a portion located on the rear end side of the gauge line A). As a result, even if the tip end of the cutting tool 100 is subjected to a lateral force while processing a work with the cutting tool 100, displacement of the cutting tool 100 can be prevented via the tip end portion 28.

Moreover, according to the tool holder 10 of the present embodiment, the tapered collet 21 further has the ring groove 24 formed in its outer periphery between the main tapered surface 22 and the tip end tapered surface 28 so as to extend in the circumferential direction. Moreover, the tip end tapered member 41 has the ring ridge 43 that engages with the ring groove 24. Thus, the tapered collet 21 can be moved toward the tip end side when loosening the lock nut 31. This facilitates the operation of removing the tapered collet 21 from the collet chuck main body 11.

Moreover, the sidewall on the tip end side of the ring groove 24 has the tapered surface 25 that is tapered toward the axial rear end, and the ring ridge 43 of the tip end tapered member 41 has the tapered abutting surface 44 that abuts on the tapered surface 25 of the ring groove 24. Thus, the tapered collet 21 can be removed from the lock nut 31 without being tilted.

Moreover, the tool holder 10 of the present embodiment further has the snap ring 61 attached to the inner periphery of the lock nut 31, for receiving the rear end of the tip end tapered member 41. Thus, when loosening the lock nut 31, the tip end tapered member 41 is moved toward the tip end side together with the lock nut 31, whereby the tapered collet 21 can be reliably removed from the collet chuck main body 11. Moreover, the snap ring 51 can be removed from the lock nut 31, whereby the tip end tapered member 41 and the plain bearing 51 can be easily disassembled from the lock nut 31. This improves the efficiency of maintenance of the lock nut 31, such as replacement of the plain bearing 51.

Figure 4:
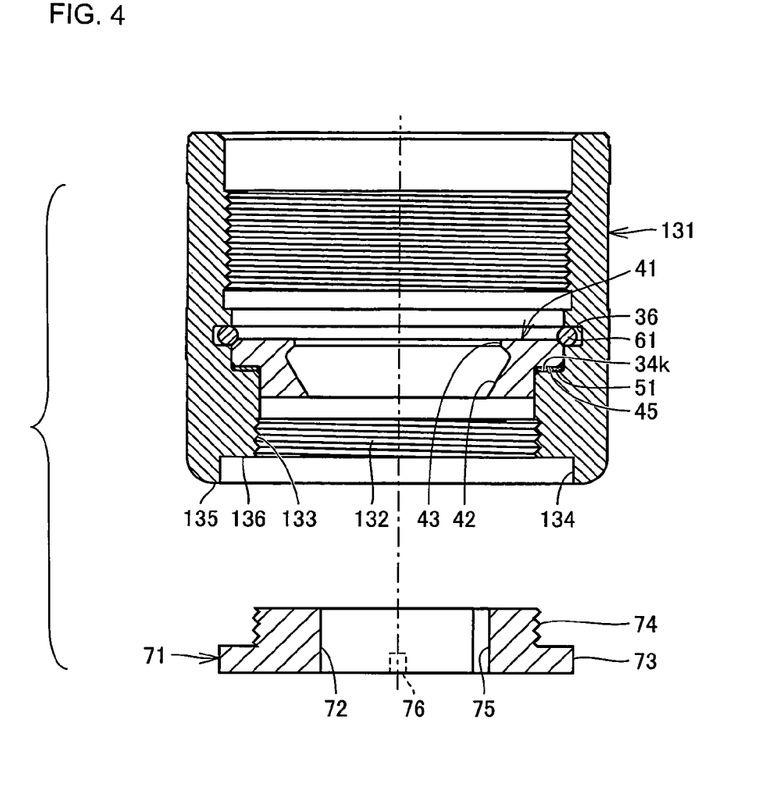
FIG. 4 is an exploded longitudinal section showing a lock nut and a lid member of another embodiment.
Figure 5:
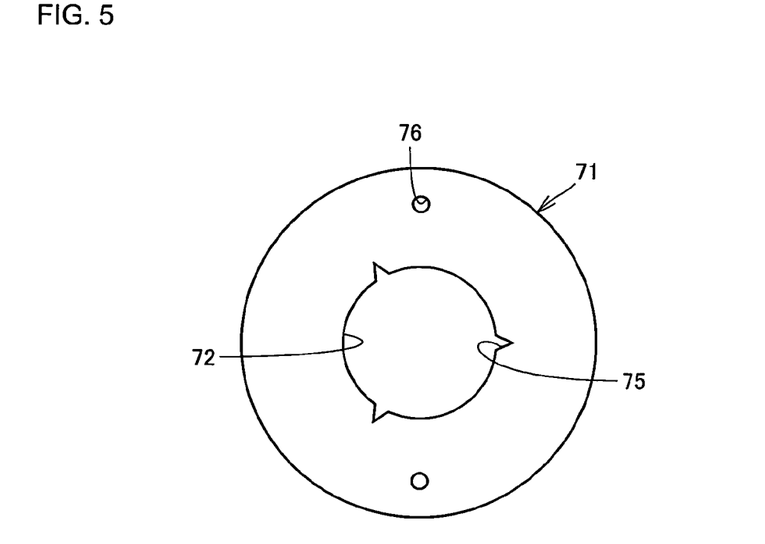
FIG. 5 is a front view of the lid member of the embodiment when viewed from the tip end side.

Another embodiment of the present invention will be described below. FIG. 4 is an exploded longitudinal section showing a lock nut and a lid member according to the present embodiment, and FIG. 5 is a front view of the lid member when viewed from the tip end side. The structure common to that of the above embodiment is denoted with the same reference characters, and description thereof will be omitted. The structure different from that of the above embodiment will be described below. Like the lock nut 31 described above, a lock nut 131 of the present embodiment is also screwed on the collet chuck main body 11 to press the tapered collet 21 into the tapered hole 18. The tool holder of the present embodiment further includes a lid member 71. The lid member 71 is attached to a tip end opening 132 of the lock nut 131 to cover the tip end of the tapered collet 21.

The lock nut 131 extends further toward the tip end side from the rear end flat surface 34k, and the tip end of the lock nut 131 forms the tip end opening 132. Internal threads 133 are formed on the inner periphery of the tip end opening 13. A recess 134, which has a larger diameter than that of the internal threads 133, is formed in a portion of the inner periphery, which is located on the tip end side of the internal threads 133 are. The circular recess 134 is recessed from a tip end face 135 of the lock nut 131 so as to have an annular stepped portion 136 of a predetermined depth.

The lid member 71 is a cylindrical body having a tool through hole 72 that extends through the lid member 71 from its rear end to its tip end. The lid member 71 has a flange portion 73 at its tip end, and the flange portion 73 protrudes radially outward. The lid member 71 further has external threads 74 formed on the outer periphery of its rear end portion. The external threads 74 are screwed on the internal threads 133 of the tip end opening 132. The shank portion 101 of the cutting tool 100 is inserted into the tool through hole 72 from the tip end side thereof. The outer diameter of the flange portion 73 is slightly smaller than the inner diameter of the recess 134. The inner diameter of the tool through hole 72 is slightly larger than the outer diameter of the shank portion 101. Grooves 75 for blowing a cutting fluid are formed on the inner wall surface of the tool through hole 72. The grooves 75 extend axially from the rear end to the tip end of the lid member 71, and are provided at regular intervals in the circumferential direction. Jig engagement holes 76 for inserting jigs for rotating the lid member 71 therein are formed in the tip end surface of the flange portion 73.

A chucking operation will be described below.

First, the plain bearing 51, the tip end tapered member 41, and the snap ring 61 are attached in advance to the inner periphery of the lock nut 131. Then, the tip end portion 28 of the tapered collet 21 is inserted into a rear end opening of the lock nut 131. At this time, the diameter of the tip end portion 28 is reduced, and in this state, the tip end portion 28 is inserted into the tip end tapered member 41. As inserted further in the tip end tapered member 41, the tip end portion 28 restores to its original outer diameter, whereby the ring groove 24 of the tapered collet 21 engages with the ring ridge 43 of the tip end tapered member 41. Thus, the tapered collet 21 is attached to the lock nut 31 in a relatively rotatable manner.

Then, the external threads 74 of the lid member 71 are screwed onto the internal threads 133 of the lock nut 131 and fastened thereon, thereby attaching the lid member 71 to the lock nut 131. Thus, the flange portion 73 of the lid member 71 is accommodated in the recess 134, and closely contacts the annular stepped portion 136. The rear end of the lid member 71 faces the tip end portion 28 of the tapered collet 21 and the tip end tapered member 41 with an axial gap therebetween.

Then, the main tapered surface of the tapered collet 21 is inserted into the tapered hole 18 of the collet chuck main body 11. The internal threads 32 of the lock nut 131 are screwed on the external threads 17 of the collet chuck main body 11, whereby the lock nut 131 is temporarily fastened to the collet chuck main body 11. Then, the shank portion 101 of the cutting tool 100 is inserted through the tool through hole 72 of the lid member 71, and into the tool insertion hole 23 of the tapered collet 21. In this temporarily fastened state, the diameter of the tapered collet 21 has not been reduced at all, or has been hardly reduced. Thus, the shank portion 101 can be easily inserted through the tool insertion hole 23. The grooves 75 are covered by the outer peripheral surface of the shank portion 101 to form cutting fluid passages, thereby communicating with the slots 26. The cutting fluid passages will be described below.

Then, the internal threads 32 and the external threads 17 are further rotated (screwed) relative to each other to securely fasten the lock nut 131 to the collet chuck main body 11. Thus, the main tapered surface 22 is pressed into the tapered hole 18. As a result, the diameter of the tapered collet 21 is reduced, whereby the shank portion 101 of the cutting tool 100 is chucked in the tool holder.

In the state where this tool holder is attached to a main shaft of a machine tool, the cutting fluid, which is supplied to the tool holder through the inside of the main shaft, sequentially flows through the through hole 12 of the collet chuck main body 11, the slots 26 of the tapered collet 21, and the grooves 75, and is blown from the tip end of the lid member 71 toward the tip end of the cutting tool 100.

The tool holder using the lock nut 131 further includes the lid member 71, which is screwed in the tip end opening 132, for sealing the tip end opening 132 while facing the tip end portion 28 of the tapered collet 21. The lid member 71 includes the tool through hole 72 for inserting the shank portion 101 therethrough, and the grooves 75 extending from the rear end face to the tip end face of the lid member 71, for blowing the cutting fluid toward the tip end of the cutting tool 100. Thus, in the case where the cutting tool 100 is a commonly used tool having no through hole for the cutting fluid, the tip end of the cutting tool 100 for processing a work can be efficiently cooled. Moreover, unlike conventional examples, a dustproof function of the tool holder can be obtained without requiring the step of attaching a steel cover to the tip end of the tool holder. Moreover, even when the cutting tool 100 is replaced with a tool having a shank portion 101 of a different diameter, the lid member 71 need only be replaced with a lid member 71 having a tool through hole 72 of a different inner diameter. Thus, the tool holder is very versatile and economical.

Note that, although not shown in the figures, instead of the grooves 75, the lid member 71 may have cutting fluid passages for blowing the cutting fluid toward the tip end of the cutting tool 100, such as through holes extending from the rear end face to the tip end face of the lid member 71.

Figure 6:
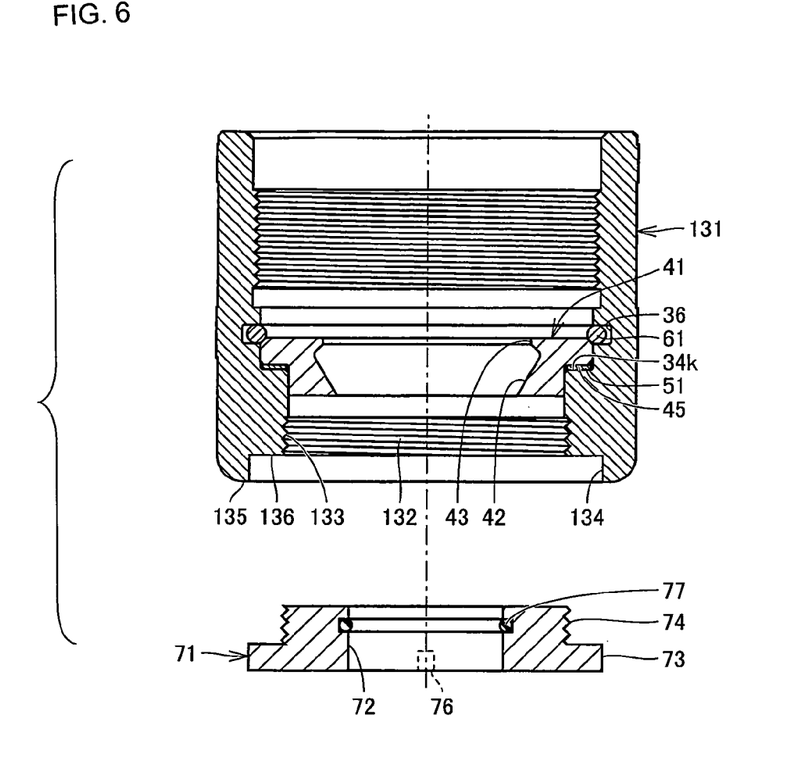
FIG. 6 is an exploded longitudinal section showing a lock nut and a lid member of still another embodiment.
Figure 7:
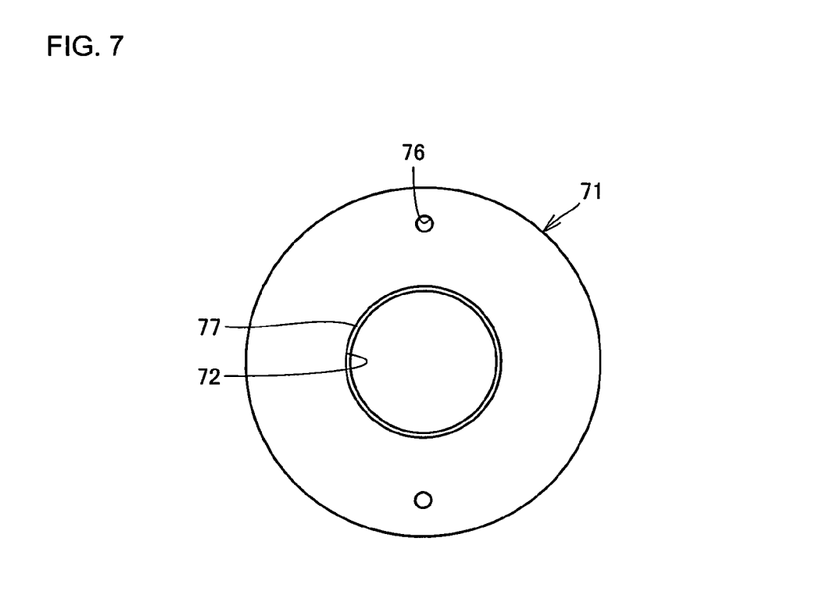
FIG. 7 is a front view of the lid member of the embodiment when viewed from the tip end side.

Still another embodiment of the present invention will be described below. FIG. 6 is an exploded longitudinal section of a lock nut of the present embodiment, and FIG. 7 is a front view of a lid member of the present embodiment when viewed from the tip end side. The structure common to that of the above embodiments is denoted with the same reference characters, and description thereof will be omitted. The structure different from that of the above embodiments will be described below. The lock nut 131 of the present embodiment is the same as the lock nut 131 of the above embodiment except that the lid member 71 has a seal member 77 instead of the grooves 75.

The seal member 77 is an O-ring attached to the inner periphery of the tool through hole 72. The seal member 77 closely contacts the outer periphery of the shank portion 101, and closes the gap between the inner periphery of the tool through hole 72 and the outer periphery of the shank portion 101.

The tool holder using the lock nut according to the present embodiment has the seal member 77 that closes the gap between the inner periphery of the tool through hole 72 of the lid member 71 and the outer periphery of the shank portion 101 of the cutting tool 100. Thus, no cutting fluid flows toward the tip end through the gap between the inner periphery of the tool through hole 72 and the outer periphery of the shank portion 101 of the cutting tool 100, whereby the shank portion 101 can be sealed in a fluid-tight manner. Thus, the tool holder of the present embodiment is advantageously used in the case where the cutting tool 100 is a tool having a through hole for a cutting fluid. The through hole for the cutting fluid is provided inside the tool so as to extend from the shank portion toward the tip end of the tool, and supplies the cutting fluid to the tip end of the tool. Moreover, in the lid member 71 of the present embodiment, the shank portion 101 is sealed in a fluid-tight manner, whereby the cutting fluid can be supplied to the shank portion 101 without leaking through the gap.

Figure 8:
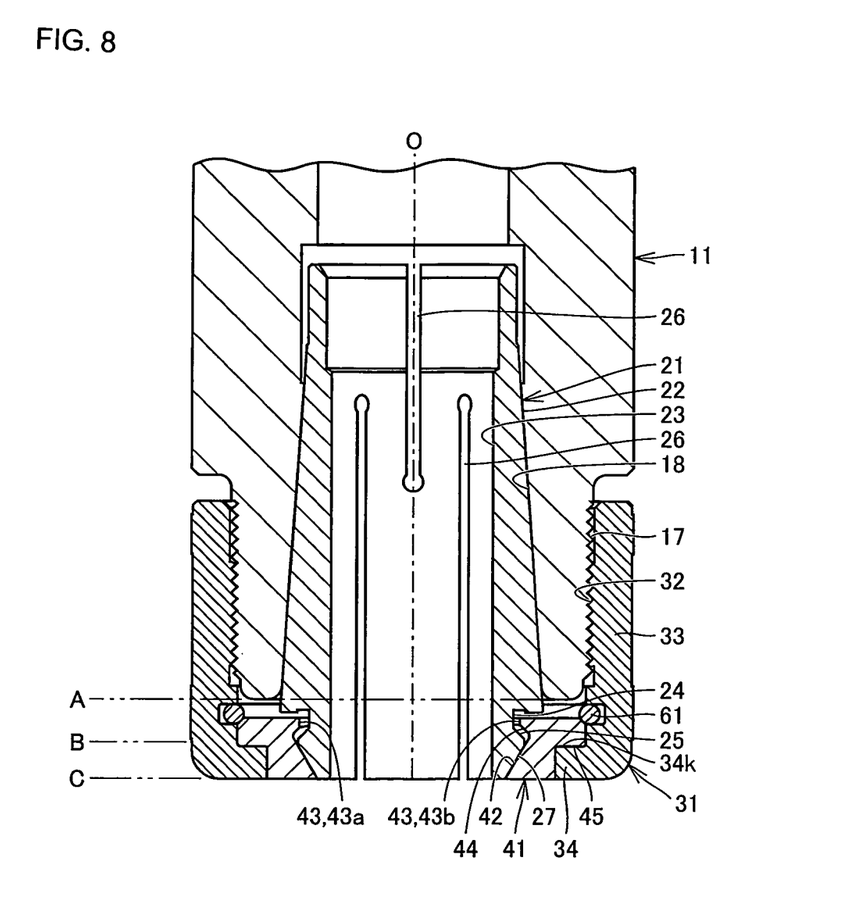
FIG. 8 is an enlarged longitudinal section of a tool holder of a further embodiment.

A further embodiment of the present invention will be described below. FIG. 8 is an exploded longitudinal section showing the lock nut of the present embodiment. The structure common to that of the above embodiments is denoted with the same reference characters, and description thereof will be omitted. The structure different from that of the above embodiments will be described below. In the present embodiment, no plain bearing 51 is inserted between the annular flat surface 45 of the tip end tapered member 41 and the rear end flat surface 34k of the lock nut 31. Instead, the annular flat surface 45 has been surface treated so as to reduce the friction coefficient. An example of such a surface treatment is a coating treatment or a polishing treatment. Specific examples of such a surface treatment include a treatment of depositing a titanium nitride (TiN) film on the annular flat surface 45, an ion nitriding treatment, a diamond like carbon (DLC) coating treatment, and a mirror lapping treatment.

According to the embodiment of FIG. 8, since the annular flat surface 45 is surface treated to reduce the friction, the frictional resistance between the annular flat surface 45 and the rear end flat surface 34k, which face and contact each other, can be significantly reduced. Thus, a pressing force resulting from fastening of the lock nut 31 is uniformly applied to the tapered collet 21, and no torsional force resulting from rotation of the lock nut 31 is transmitted to the tapered collet 21. As a result, even if the lock nut 31 is fastened with a large force, the low friction annular flat surface 45 allows the tip end tapered member 41 to be displaced in the direction perpendicular to the axis, whereby the tip end tapered member 41 is fastened together with the tapered collet 21 along the tapered hole 18 of the collet chuck main body 11.

Thus, the main tapered surface 22 of the tapered collet 21 moves along the tapered hole 18 without being tilted, and the tapered collet 21 is reliably pressed into the tapered hole 18. Moreover, the tapered collet 21 is not tilted when fastening the lock nut 31. As a result, the shank portion 101 can be chucked by the collet chuck main body 11 without being tilted with respect to the axis of the collet chuck main body 11. Thus, deflection rotation of the cutting tool 100 held by the tapered collet 21 can be eliminated, and stable deflection accuracy can be obtained.

Moreover, in the embodiment of FIG. 8, the tip end tapered member 41 has a ring shape that surrounds the outer periphery of the taper collet 21, and the ring ridge 43 is provided on the inner periphery of the tip end tapered member 41. The ring ridge 43 protrudes radially inwards, and extends in the circumferential direction. The contour shape of the inner peripheral edge of the ring ridge 32 is a circle whose center is offset from an axial center O of the tip end tapered member 41. Thus, the distance from an inner peripheral edge 43a, which is located on the offset side, to the axial center O is longer than the distance from an inner peripheral edge 43b, which is located on the side opposite to the inner peripheral edge 43a with respect to the axial center O, to the axial center O.

In the embodiment of FIG. 8, the ring ridge 43, which is formed on the inner periphery of the tip end tapered member 41 so as to protrude radially inward and extend in the circumferential direction, firmly engages with the ring groove 24 of the tapered collet 21. Thus, the tapered collet 21 can be removed from the tapered hole 18 by rotating the lock nut 31 to loosen the screwing of the internal threads 32.

According to the embodiment of FIG. 8, the contour shape of the inner peripheral edge of the ring ridge 43 is a circle whose center is offset from the axial center O of the tip end tapered member 41. Thus, the distance from a part of the inner peripheral edge, which is located on the offset side, to the axial center O is longer than the radius of the inner peripheral edge. Moreover, the distance from a part of the inner peripheral edge, which is located on the side opposite to the offset side with respect to the axial center O, to the axial center O is shorter than the radius of the inner peripheral edge. Thus, the tip end tapered member 41 has a larger inner space region on the offset side.

Thus, when de-chucking the shank portion 101 from the tool holder 10, the lock nut 31 is separated from the collet chuck main body 11, and the tool 100 is removed from the tool insertion hole 23 of the tapered collet 21. In this state, the tapered collet 21 is tilted with respect to the axial center O toward the inner peripheral edge 43a on the offset side while slightly reducing the diameter of the tapered collet 21. Thus, the tapered collet 21 can be easily removed from the inner space region of the tip end tapered member 41. Moreover, the tapered collet 21 can be easily inserted into the inner space region of the tip end tapered member 41 by reverse procedures.

Although the embodiments of the present invention have been described with reference to the drawings, the present invention is not limited to the illustrated embodiments. Various modifications and variations can be made to the illustrated embodiments within a scope that is the same as, or equivalent to, the present invention.

The tool holder of the present invention is advantageously used in machine tools for holding a cutting tool to process a work.

What is claimed is:

1. A tool holder, comprising:
   a collet chuck main body having a tapered hole formed in its tip end portion so as to be tapered toward an axial rear end;
   a tapered collet having a tool insertion hole that extends in an axial direction, a main tapered surface that fits in said tapered hole, and a tip end tapered surface that is positioned on an axial tip end side of said main tapered surface and is tapered toward an axial tip end;
   a cylindrical lock nut having a nut body with internal threads that are screwed on external threads formed on an outer periphery of said tip end portion of said collet chuck main body, and a flange portion that protrudes radially inwardly from said nut body and that has a first annular flat surface extending perpendicular to said axial direction, for reducing a diameter of said tool insertion hole by pressing said tapered collet into said tapered hole;
   a tip end tapered member having a tapered abutting surface that fits on said tip end tapered surface, and an annular portion that protrudes radially outwardly and that has a second annular flat surface extending perpendicular to said axial direction, said tip end tapered member being pressed toward said axial rear end by said lock nut; and
   a plain bearing positioned on a plane perpendicular to said axial direction in which said tip end tapered member is pressed by said lock nut through said plain bearing, said plain bearing being inserted between said first annular flat surface of said lock nut and said second annular flat surface of said tip end tapered member, whereby said plain bearing reduces sliding friction and establishes a sliding contact of said first and second annular flat surfaces through said plain bearing and thereby allows said tip end tapered member to move slightly along said plane perpendicular to said axial direction.

2. The tool holder according to claim 1, wherein said tapered collet further has a ring groove formed in a portion of its outer periphery between said main tapered surface and said tip end tapered surface, and extending in a circumferential direction, and said tip end tapered member further has a protrusion that engages with said ring groove.

3. The tool holder according to claim 2, wherein a sidewall on a tip end side of said ring groove of said tapered collet has a tapered surface that is tapered toward said axial rear end, and said protrusion of said tip end tapered member has a tapered abutting surface that abuts on said tapered surface of said ring groove.

4. The tool holder according to claim 2, wherein said tip end tapered member has a ring shape that surrounds said outer periphery of said tapered collet, said protrusion of said tip end tapered member is a ridge formed on an inner periphery of said tip end tapered member so as to protrude radially inward and to extend in a circumferential direction, and a contour shape of an inner peripheral edge of said ridge is a circle whose center is offset from an axial center of said tip end tapered member.

5. The tool holder according to claim 1, further comprising:

retaining means attached to an inner periphery of said lock nut, for receiving a rear end of said tip end tapered member.

6. The tool holder according to claim 1, further comprising:

a lid member attached to a tip end opening of said lock nut, for sealing said tip end opening while facing a tip end of said tapered collet, wherein said lid member has a tool through hole through which a shank portion of a tool extends, and a cutting fluid passage extending from a rear end face to a tip end face of said lid member, for blowing a cutting fluid toward a tip end of said tool.

7. The tool holder according to claim 1, further comprising:

a lid member attached to a tip end opening of said lock nut, for sealing said tip end opening while facing a tip end of said tapered collet, wherein said lid member has a tool through hole through which a shank portion of a tool extends, and a seal member provided on an inner periphery of said tool through hole, for closing a gap between said inner periphery of said tool through hole and an outer periphery of said shank portion of said tool.

* * * * *